United States Patent [19]

Erickson et al.

[11] 4,398,723
[45] Aug. 16, 1983

[54] VIEWING DEVICE FOR GENERATING A THREE-DIMENSIONAL IMAGE

[75] Inventors: Erick E. Erickson; Christian H. Oberth, both of Chicago; Jeffrey D. Breslow, Highland Park; Douglas P. Montague, Chicago, all of Ill.

[73] Assignee: Marvin Glass & Associates, Chicago, Ill.

[21] Appl. No.: 229,659

[22] Filed: Jan. 29, 1981

[51] Int. Cl.³ .............................................. A63F 9/02
[52] U.S. Cl. ................................ 273/313; 273/1 GC; 352/72; 40/160; 40/574; 40/577
[58] Field of Search ...................... 273/16 C, 1 E, 856, 273/88, 94, 237, 238, 313–315; 434/25, 26, 29; 340/378.1–378.4, 705; 352/72, 74–76, 78; 40/427, 550–552, 575, 577, 615, 564

[56] References Cited

U.S. PATENT DOCUMENTS

| | | | |
|---|---|---|---|
| 3,473,870 | 10/1969 | Platt | 352/129 |
| 3,593,259 | 7/1971 | Stormo | 340/27 |
| 3,939,579 | 2/1976 | Andrews et al. | 434/316 |
| 3,970,172 | 3/1982 | Nakamura | 273/313 |
| 4,095,791 | 6/1978 | Smith et al. | 273/DIG. 28 |
| 4,106,218 | 8/1978 | Polstorff | 434/34 |
| 4,306,768 | 12/1981 | Egging | 350/174 |

*Primary Examiner*—Vance Y. Hum
*Assistant Examiner*—Leo P. Picard

[57] ABSTRACT

A game apparatus includes a viewing device which incorporates a viewing console that receives replaceable visual cartridges and a microcomputer for generating game functions. The visual cartridges are automatically opened upon insertion into the viewing console to reveal a three-dimensional scene. When the visual cartridge is opened, its cover swings into alignment with a plurality of light emitting elements. These elements are operative to selectively illuminate various regions of the cover and to project indicia located on the illuminated region onto the scene provided by the viewing cartridge. Each viewing device can be provided with a plurality of different cartridges with covers bearing different symbols to produce a variety of visual effects useful in implementing game devices, particularly microcomputer controlled game devices, and visual displays such as advertising displays and the like.

24 Claims, 10 Drawing Figures

Fig 10

VIEWING DEVICE FOR GENERATING A THREE-DIMENSIONAL IMAGE

BACKGROUND OF THE INVENTION

1. Field of the Invention

This invention relates to viewing devices, and to such devices with removable cartridges capable of displaying a three-dimensional image for viewing. More specifically the present invention relates to such devices capable of superimposing various images onto the three-dimensional image displayed by the cartridge and particularly to a device using a computer to control the image superimposition.

2. Description of the Background Art

Viewing devices which enable a user to selectively position one of a plurality of transparent film slides to be viewed in a viewer, using background ambient light for illumination are well known and commercially available. These devices are often available in binoculars form with film cartridges that include separate left and right images in an attempt to produce what is apparently a three-dimensional image.

In addition, a variety of video arcade games now popular include a screen upon which separate indicia are illuminated to implement various games. Often the indicia which is illuminated on the screen is moved across the screen simulating various real life activities. The screen itself commonly contains various indicia, usually in two-dimensional form, useful in adding realism to the images illuminated on the screen.

SUMMARY OF THE INVENTION

A viewing device for producing a three-dimensional visual field includes a housing and a cartridge removably positionable within the housing. The cartridge includes means for creating a three-dimensional image within the housing visible through means on the housing for viewing the image. A light projection means for selectively superimposing one of a plurality of symbols onto the cartridge produced image is also mounted within the housing.

DETAILED DESCRIPTION OF THE PREFERRED EMBODIMENT

Figures 1, 2, 3:
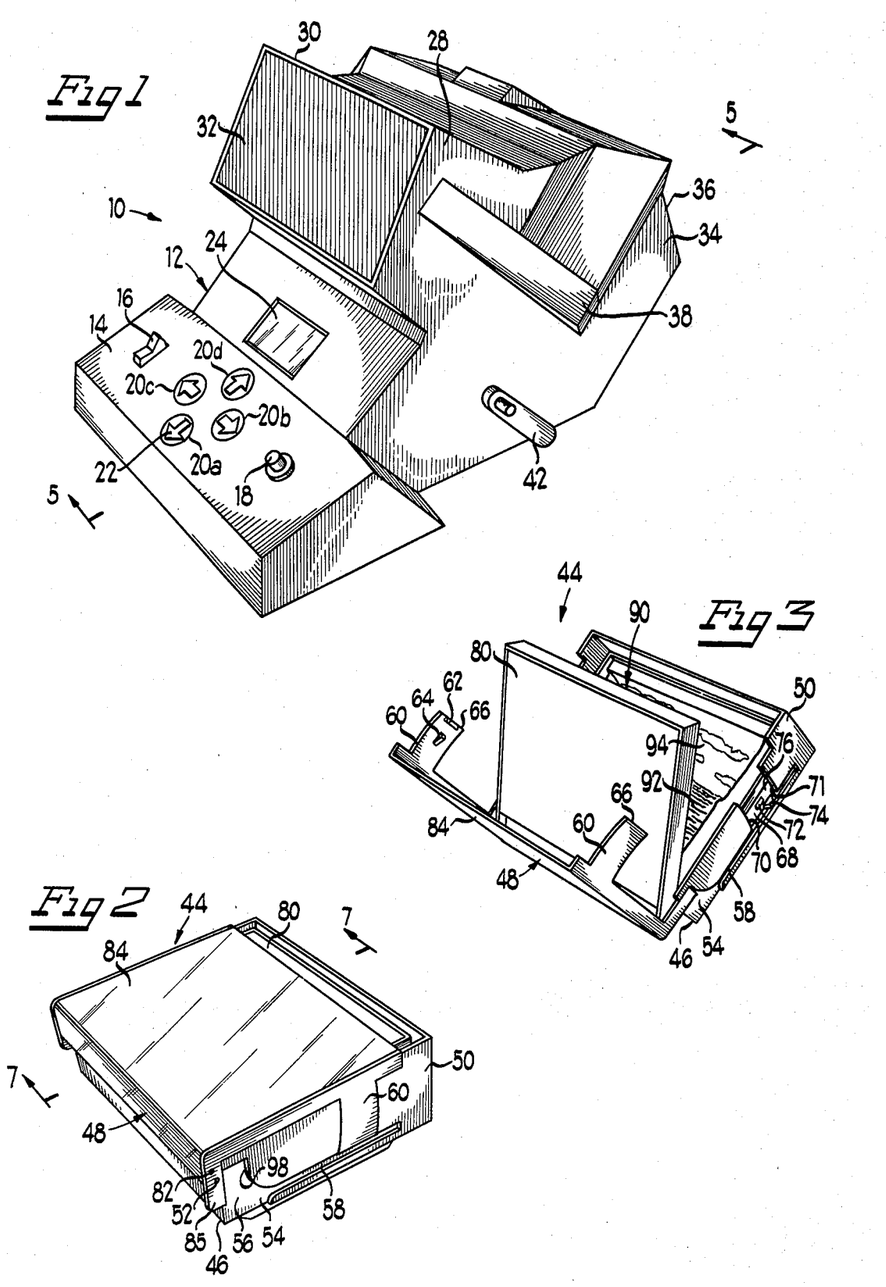
FIG. 1 is a perspective view of one embodiment of the viewing housing in accordance with the present invention, without a cartridge.
FIG. 2 is a perspective view of one embodiment of the viewing cartridge of the present invention in its closed position.
FIG. 3 is a perspective view of the viewing cartridge shown in FIG. 2 in its open configuration.

Referring to the drawing wherein like reference characters are utilized for like parts through-out, there is illustrated in FIG. 1 a viewing console 10 including a housing 12 conveniently formed of hollow molded plastic. The housing 12 includes a control panel 14 with an on/off switch 16, a pushbutton control switch 18 and a plurality of pushbuttons 20 each bearing arrow indicia 22. Adjacent the control panel 14, also supported directly on a supporting surface, is the scoring display portion 24 of housing 12. The scoring display portion 24 includes a central digital display panel 26 conveniently bearing three seven-segment display portions. Above the scoring display portion 24, angled over the supporting surface, the viewing portion 28 of housing 12 includes an outwardly extending viewing shield 30 with a viewing opening 32, a cartridge receiving portion 34 with a cartridge receiving aperture 36 and a pair of grasping handles 38 (only one of which is shown) on the sides 40 of the housing 12. Also positioned on each side 40 of housing 12 is a rotating cartridge closing lever 42.

A cartridge 44, shown in FIG. 2, is sized to slide into the cartridge receiving portion 34 of housing 12 through the cartridge receiving aperture 36. The cartridge 44 includes a base 46 which is initially inserted into the aperture 36, an L-shaped cover 48 and grooved sides 50. The cover 48 is hingedly mounted on each side 50 near the base 46 on pins 52. A groove 54 extends from base 46 along each side 50 of cartridge 44 narrowing from a widened portion 56 to a narrow portion 58.

As shown in FIG. 3, the cover 48 includes a pair of flexible outwardly extending tabs 60 near its free end 66. Each tab 60 includes on its inwardly facing side a pair of spaced cam-shaped catches 62 and 64. A catch 62 is positioned generally parallel to the end 66 of each tab 60, inclining outwardly from the surface of the tab 60 as the catch 62 extends away from the end 66. Conversely, a catch 64, extending transversely to each catch 62, tapers towards the tab 60 as it extends away from a catch 62.

Adjacent the narrow portion 58 of the groove 54 in each side 50 is a flexible cantilevered portion 68, attached at 70 to the inwardly facing surface of each side 50 to form a recess 71 in each side 50 for receiving the tabs 60. A pair of spaced latches 72 and 74 are positioned on the outward facing side 76 of each portion 68. The latch 74 is positioned along the narrow portion 58 of the groove 54, presenting an inclined surface 78 to an actuator moving from the widened portion 56 through the narrow portion 58 of groove 54. The latch 72, on the other hand, presents an inclined surface 79 to the catch 62 as it rotates with cover 48 around pins 52, biasing each tab 60 outwardly as it passes over the latches 72 until the catch 62 becomes locked between latch 72 and latch 74.

Figure 7:
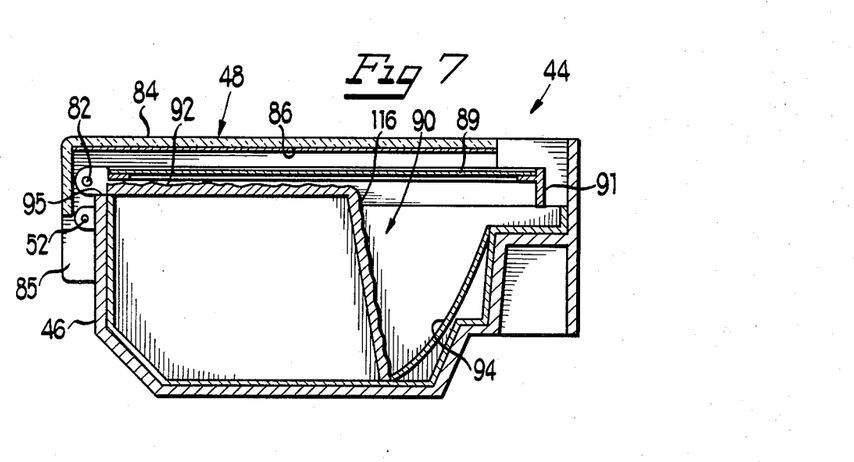
FIG. 7 is an enlarged cross-sectional view taken generally along the line 7—7 in FIG. 2.

A transparent mirrored sheet 80 is mounted on the frame 91 for rotation around pins 82. The mirrored sheet 80 has at least one surface which is reflective. As shown in FIG. 7, the mirrored sheet 80 is sandwiched between the cover 48 and the remainder of the cartridge 44 when the cover 48 is in its closed position, locked by tabs 60 to the remainder of the cartridge 44.

Figure 4:
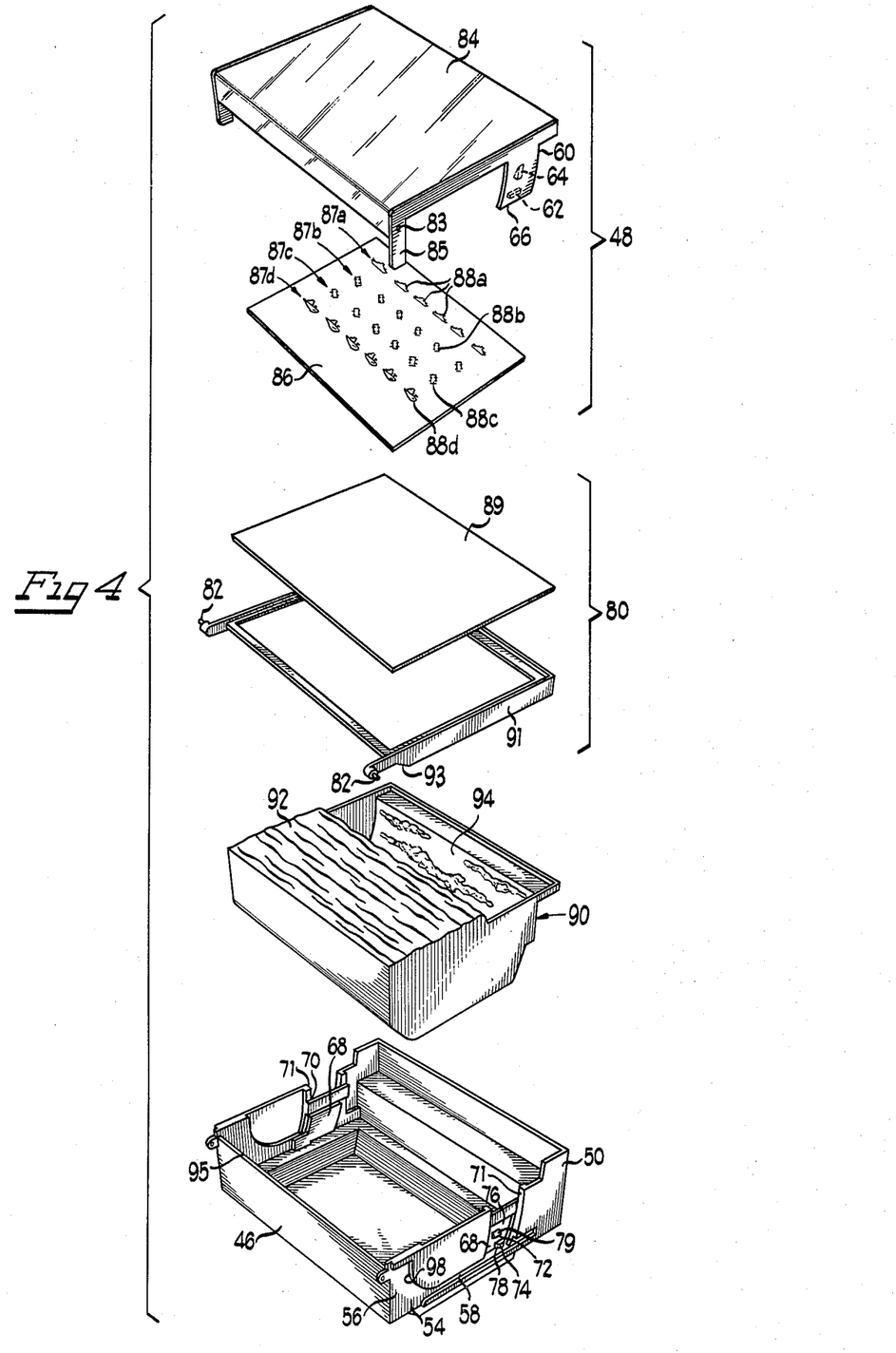
FIG. 4 is an exploded view of the viewing cartridge shown in FIG. 2.

Referring now to FIG. 4, the cover 48 includes a translucent outwardly facing portion 84 and an interior portion 86 conveniently secured to the inside surface of the portion 84. The interior portion 86 is conveniently made up of a composite sheet including a first film which is substantially impenetrable to light except for a plurality of clear indicia 88 arranged in rows 87 across the surface thereof, and a tinted second sheet colored to be transparent to light of one wavelength, for example the red light wavelength. The row 87a of indicia 88 conveniently includes a line of ship indicia, the rows 87b and 87c are made up of drum shaped depth charge indicia and the row 87d is composed of submarine indicia.

The mirrored sheet 80 includes a slide 89 and a relatively rigid frame 91 for the slide 89. The slide 89 is both transparent and reflective, being mirrored on at least one surface. The frame 91 includes the pins 82 received in the apertures 83 on the arm 85 of cover 48. The pins 82 are spaced between the pins 52 on which the cover 48 rotates and the interior portion 86. Near the pins 82, the frame 91 includes a notch 93 aligned to rest on the ledge 95 of the base 46.

Fixed within the interior of the cartridge 44 beneath the mirrored sheet 80 is a three dimensional scene creating model 90. The model 90 is conveniently formed of molded plastic and painted to simulate a three-dimensional scene including, for example, an ocean cross-section simulating portion 92 and a recessed sky and ocean surface simulating portion 94 that extends out of the plane of portion 92 and into the cartridge 44, as shown in FIG. 7. The model 90 is preferably removable from the cartridge 44, conveniently retained therein by friction.

Figures 5, 8:
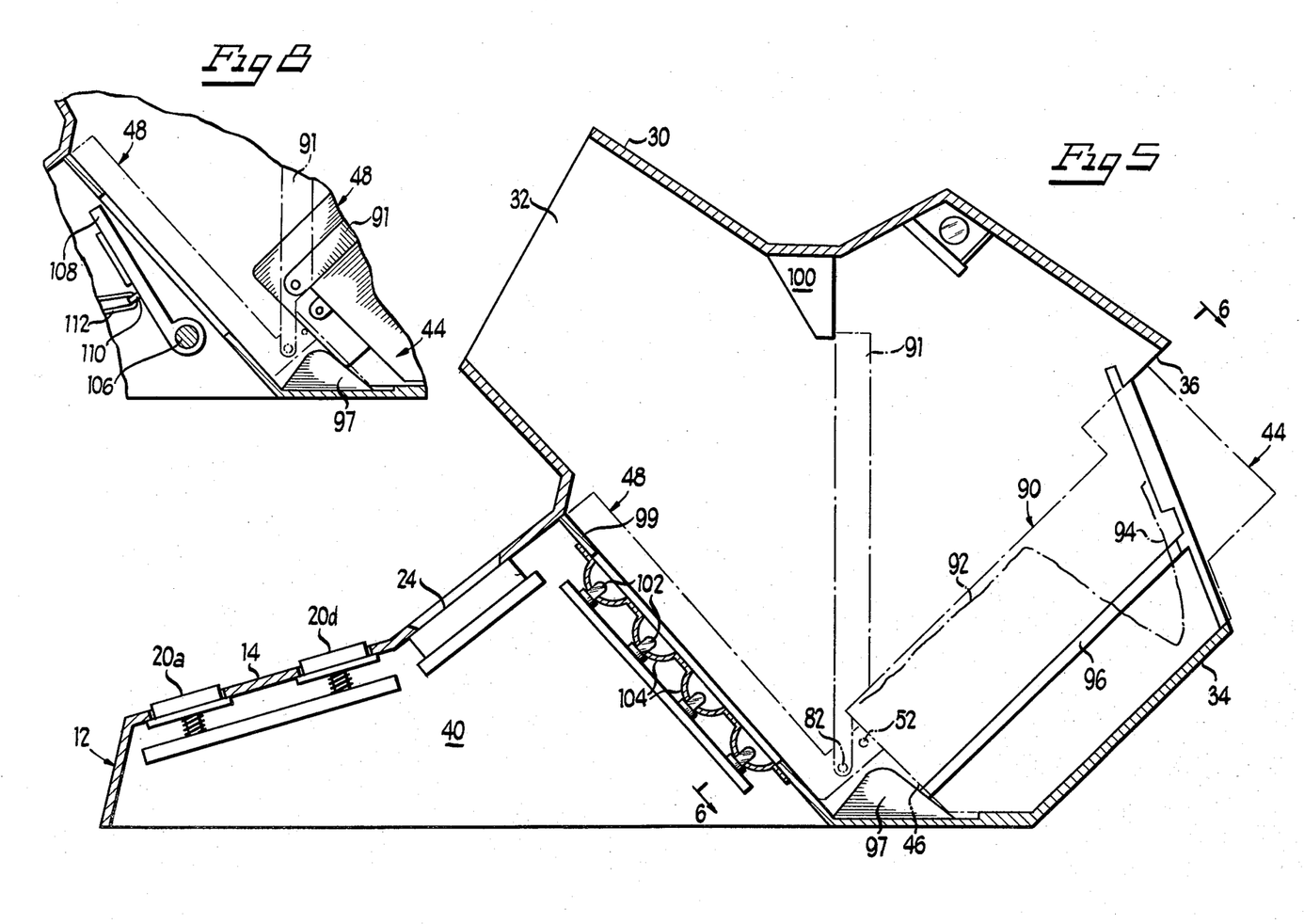
FIG. 5 is an enlarged, cross-sectional view taken generally along the line 5—5 in FIG. 1, showing a viewing cartridge in dotted lines positioned within the viewing housing.
FIG. 8 is an enlarged partial cross-sectional view taken generally along the line 8—8 in FIG. 6.

Referring to FIG. 5, a cartridge 44, shown in dotted lines, is initially positioned within the cartridge receiving portion 34 of housing 12 with the cover 48 facing the aperture 32 and the base 46 against the angled stop 97 at the bottom of the cartridge receiving portion 34. Extending inwardly from the interior surface of cartridge receiving portion 34 an elongate land 96 on the inside surface of each side 40 of housing 12 guides the insertion of the cartridge 44. When the cartridge 44 is inserted through the aperture 36, the lands 96, also shown in FIG. 6, contact the widened portion 56 of groove 54 on each side 50 and guide the cartridge 44 into the portion 34. The curved surface 98 of widened portion 56 in turn guides the land 96 into the narrowed portion 58 of groove 54.

As the cartridge 44 continues to slide into the portion 34, each land 96 depresses the inclined surface 78 of the latch 74 on each flexible cantilevered portion 68. As a result the portion 68 on each side 50 is deflected inwardly causing the cover 48 to spring open, rotating in a counterclockwise direction due to the weight of the cover and its eccentric mounting on the remainder of the cartridge 44. If necessary, however, the cover 48 can be spring biased to its open position. The cartridge continues to rotate until it comes to rest on the housing extension 99 in the position shown in FIGS. 5 and 3. The mirrored sheet 80 initially rotates with the cover 48 since the cover 48 pulls downwardly on the sheet 80 causing the sheet 80 to rotate on the notch 93 around its point of contact with the ledge 95. However, the mirrored sheet 80 which is slightly longer than the cover 48, is stopped by the housing extension 100, allowing the cover 48 to continue to rotate underneath the extension 100. Thus as shown in FIG. 5, the cover 48 rotates about 90° while the mirrored sheet 80 rotates only about 45°. In this arrangement the mirrored sheet 80 is located at 45° to the line of sight, as indicated by the arrow A, through the opening 32 to the model 90, with the cover 48 completely concealed from view.

A matrix of light emitting elements 102, conveniently red light emitting diodes in a four by six matrix, are arranged to shine upwardly adjacent the cover 48 now positioned against extension 99. Each element 102 is retained within a hemispherical portion 104 which contacts and encircles a region of cover 48, preventing light from passing from one portion 104 to another. One element 102 is aligned with each of the indicia 88 on cover 48.

Figure 6:
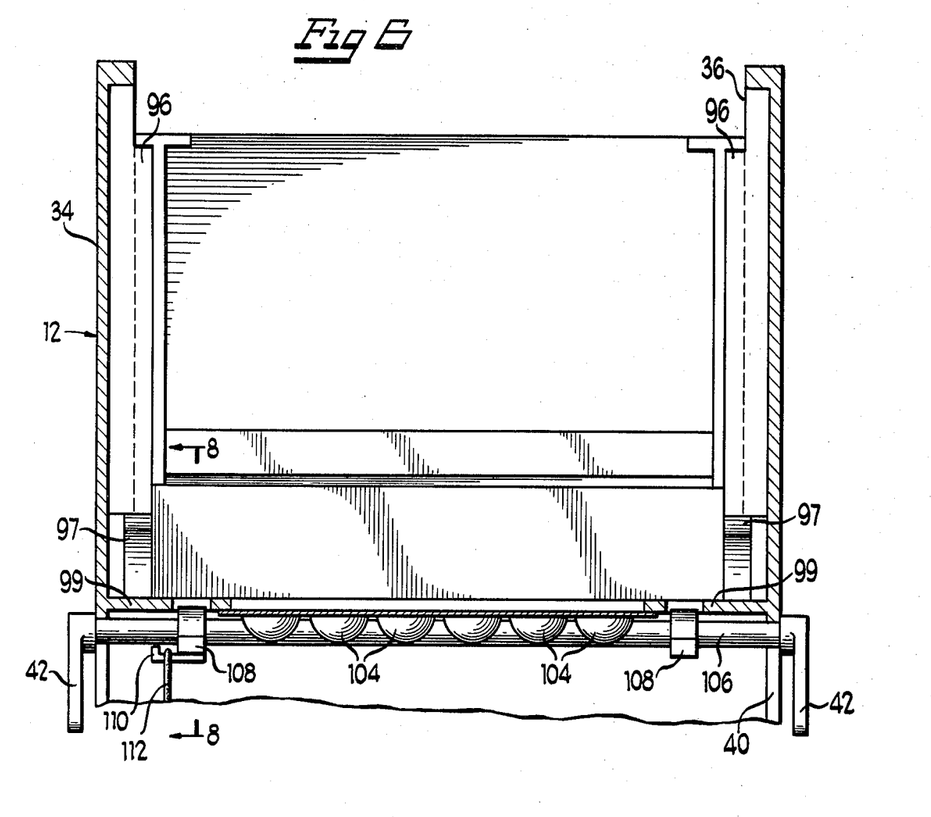
FIG. 6 is a cross-sectional view taken generally along the line 6—6 in FIG. 5.

Rotating cartridge closing levers 42, shown in FIG. 1, are connected by an axle 106 which extends completely across the housing 12 as shown in FIG. 6. A pair of actuating arms 108 are fixed within the housing 12 to the axle 106 to either side of the matrix of light emitting elements 102 for rotation with the axle 106 when the levers 42 are rotated. One arm 108 includes a laterally extending pin 110 encircled by a rubber band or other resilient member 112 which is attached on one end to the housing 12. The rubber band 112 serves to bias the axle 106 and arms 108 to a preferred inactive position.

As shown in FIG. 8, when the levers 42 are rotated in a clockwise direction against the bias provided by the members 112, the actuating arms 110 contact and push the cover 48, and eventually push the mirrored sheet 80 as well, back into the cartridge 44. The cover 48 and sheet 80 are latched to the cartridge 44 by the tabs 60 which spring outwardly over each latch 72. The tabs 60 are then latched by the juxtaposition of catches 62 and latches 72. Upon complete rotation of the levers 42, the cover 48 and sheet 80 are rotated from the position shown in FIG. 3 to the position shown in FIG. 2 and from the position shown in dotted lines in FIG. 8 to the position shown in solid lines in FIG. 8. The resilient members 112 then automatically return the levers 42 to their inactive position.

Figure 9:
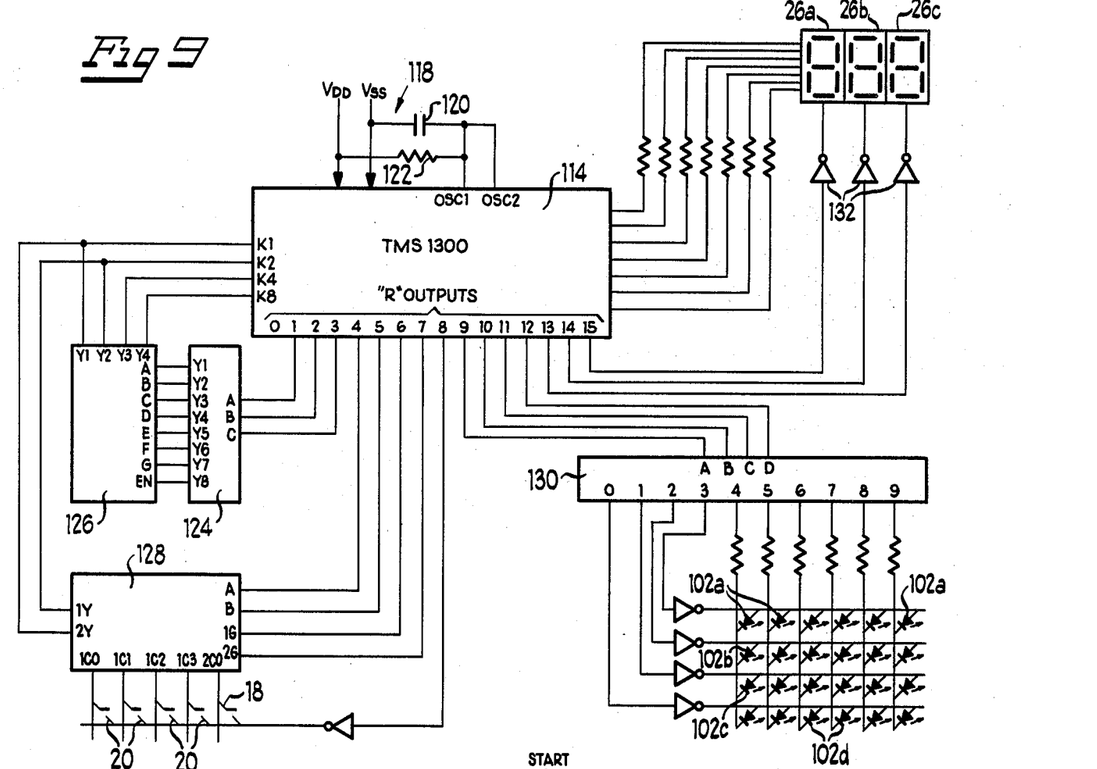
FIG. 9 is an electronic schematic showing circuitry useful in implementing the embodiment of the present invention shown in FIG. 1.

As shown in FIG. 9, a microcomputer 114, located within the housing 12, is electrically connected to the pushbutton control switch 18 and the pushbuttons 20. In addition, the microcomputer 114 operates the display panel 26 and the light emitting elements 102. Thus a wide variety of visual displays can be created by the microcomputer 114 and as a result a number of games may be implemented. Although only one such game is described below, the microcomputer 114 may be programmed to implement a variety of other games. Furthermore, despite the fact that the device is described in a game application, this should not be construed to so limit the scope of the present invention, which is applicable to a wide variety of display utilizations, including teaching and advertising applications and the like.

To utilize the console 10, a cartridge 44 including a model 90 implementing a desired scene is plugged into the cartridge receiving aperture 36 of housing 12. As the cartridge 44 slides into the portion 34, the cover 48 automatically swings open, rotating to a position flush against the matrix of light emitting elements 102. The mirrored sheet 80 rotates with the cover 48 until stopped by the extension 100. Thus, when a player looks through the viewing opening 32 into the viewing shield 30 on housing 12 the player views the model 90 through the mirrored sheet 80. The illustrated model 90 provides what appears to be a three-dimensional cross-sectional view of an ocean scene with the water shown in cross-section and the sky above the water apparently having depth because of the recess in the portion 94. The player also observes, apparently superimposed on the model 90 the indicia 88 on the cover 48. Actually the mirrored sheet 80 reflects the indicia 88 from the cover 48 into the viewer's line of sight when one or more indicia 88 are illuminated by one or more light emitting elements 102.

More specifically, when a player turns on the on/off switch 16, the microcomputer 114 actuates a selected light emitting element 102a behind one of the ship indicia 88a shown in FIG. 4. As a result a ship is reflected from the cover 48 onto the mirrored sheet 80 to appear as if it is located on the surface region 116 of the sky and ocean surface simulating portion 94 of the model 90. Since one of a line of six light emitting elements 102 are arranged behind each of the line of six ship indicia 88a any one of the "ships" can be selected so that the position of the ship along the surface 116 can be chosen, in accordance with programmed instructions, by the microcomputer 114.

Simultaneously with the illumination of a ship, the microcomputer 114 automatically sequentially illuminates, for instance, the light emitting elements 102d projecting a submarine indicia 88d onto the mirrored sheet 80 and thereby apparently flashing the image of a submarine onto the lower region of the ocean simulating portion 92 of the model 90. As one submarine indicia 88d after another is flashed on and then quickly off an illusion is created to the player peering through the opening 32 that a submarine is moving across the screen under water beneath the ship indicia 88.

The player then positions the image of the ship as desired along the surface region 116 by operating either of the pushbuttons 20c or 20d to move the "ship" to the left or right along the surface region 116. Each time a pushbutton 20 is operated the image of the ship is moved by turning off the previously illuminated element 102a and illuminating an adjacent element 102a.

When the player feels that the "ship" is appropriately positioned, the player actuates the pushbutton control switch 18. At this time the image of the ship disappears and a depth charge indicia 88b is illuminated on the ocean simulating portion 92 directly beneath the position where the ship was previously located using one of the light emitting elements 102b. Thereafter, the depth charge indicia 88b is turned off and a depth charge indicia 88c directly beneath the previously illuminated indicia is operated using one of the light emitting elements 102c to emit a flash of light. If the rate of descent of the depth charge indicia intercepts the path of the submarine indicia, the submarine is "sunk" and its indicia disappears from the screen. Otherwise the submarine indicia continues to move across the screen and the player attempts again to sink the submarine in the same manner. Conveniently a player has a predetermined amount of time to sink as many submarines as possible and the number of "sinkings" is automatically accumulated and displayed on display panel 26.

The above described game has been given by way of an example only, the number of possible games and displays limited only by the capability of the microcomputer 114 and the ingenuity of its programmer. The number of games and displays that may be played on the device is considerably greater than the one example given above. In addition, the number of different cartridges 44 that may be interchangeably positioned in the housing 12 is unlimited and thus an even greater variety of game and display possibilities can be implemented.

Referring now in greater detail to FIG. 9, the microcomputer 114 may be implemented using a single chip large scale integrated microcomputer. The TMS 1300 single chip microcomputer commercially available from Texas Instruments, Inc. is suitable for use as the microcomputer 114. The chip contains the input and output circuitry, the arithmetic logic unit, and the memory required to implement the device 10.

A timing circuit generally designated 118 includes a capacitor 120 and a resistor 122. The circuit 118 serves to reset and initiate the operation of the microcomputer 114 each time the power is turned on and off by the on/off switch 16. In addition through the inputs labeled OSC1 and OSC2 the circuit 118 controls the operation of the internal clock of the microcomputer 114.

The microcomputer 114 has a plurality of outputs designated as R0 through R15 and a plurality of inputs designated as K1, K2, K4 and K8. The outputs R1 through R3 may be coupled to any one of the inputs through a decoder 124 and a read only memory module 126. The read only memory module 126 stores the rules necessary to implement the various games and/or displays. The decoder 124 addresses the memory module 126 in accordance with coded signals on outputs R1 through R3. Preferably, the memory module 126 may be removed from the housing 12 and replaced with other suitable memory modules in the form of read only memory integrated circuits already programmed to implement various other displays and games. The microcomputer 114 determines how to proceed in accordance with the game rules or display guidelines by selectively raising the outputs R1 through R3 to their high state and monitoring the response from the memory module 126 through its inputs K1 through K8.

Similarly the outputs R4 through R8 are connected to the inputs K1 through K8 through a multiplexer 128. By selectively raising the appropriate outputs R4 through R8 to their high state and monitoring the inputs K1 and K2, the microcomputer 114 is able to determine which of the switches 18 and 20 have been actuated. The multiplexer 128 is conveniently a dual four to one line multiplexer, such as the commercially available TTL integrated circuit denominated 153. The four pushbuttons 20 and the pushbutton control switch 18 are then monitored by separate multiplexer units commonly addressable through inputs A, B, 1G and 2G each with its own output 1Y or 2Y.

The outputs R9 through R12 are connected to the matrix of light emitting elements 102 by a four stage decoder 130. In accordance with the signals received from the microcomputer 114, the decoder 130 through its outputs 0 through 3 selects the appropriate row of elements 102 and through its outputs 4 through 9 selects the desired column in order to selectively illuminate for a desired time a selected element 102. The decoder 130 is conveniently implemented by a TTL integrated circuit such as the one denominated 42.

The outputs R13 through R15 are connected through the buffers 132 to the cathodes of three, seven-segment alpha-numeric displays 26a through 26c. When one of the outputs R13 through R15 goes high, the high state is applied to the buffer 132 thereby causing the cathode of the selected display 26a through 26c to be turned on. The 01 through 07 outputs of the microcomputer 114 are then utilized to select which of the segments of each unit is to be operated.

With this arrangement of inputs and outputs the microcomputer 114 is able to continuously monitor the state of switches 18 and 20 by sequentially energizing its outputs R4 through R8. In addition, by applying distinct signals to outputs R1 through R3 the microcomputer can control the play of the game in accordance with rules stored in the memory module 126. Moreover, by control of outputs R9 through R12 distinct display indicia can be visually superimposed on the scene created by the model 90 to create unique visual effects and to implement various game possibilities. At the same time, scoring or other alpha numeric indications can be displayed to the user on display panel 26.

Figure 10:
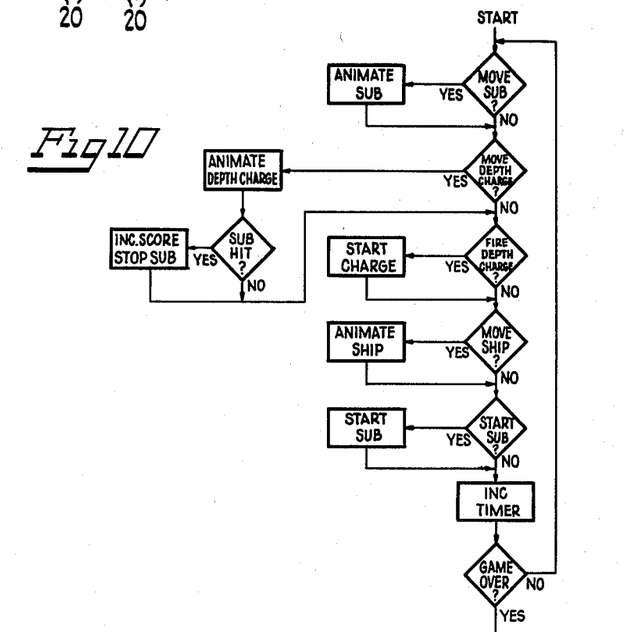
FIG. 10 is a flow chart illustrating the programming of the microcomputer shown in FIG. 9.

The microcomputer 114 is readily programmed in the manner described in the TMS 1000 Series Data Manual published in December, 1975 by Texas Instruments, Inc. to perform the functions necessary to play the desired games and to achieve a desired visual display. A flow chart showing illustrative programming of the microcomputer 114 for the game described herein is illustrated in FIG. 10.

Upon actuation of the on/off switch 16 the microcomputer moves the image of the submarine in accordance with programmed instructions stored in memory module 126. Thereafter, if a depth charge has been actuated by depressing the pushbutton 18 a depth charge image is moved by the actuation of the appropriate elements 102 in accordance with programmed instructions from the ship indicia downwardly toward the submarine indicia. If the path of the depth charge coincides with that of the submarine a hit is scored and displayed on panel 26. In any case, the depth charge is "fired" by producing a flash of light at the location where the submarine was previously positioned. Thereafter the ship indicia may be moved by the player to a new position. The submarine may again be moved in accordance with programmed instructions if a predetermined game time has not been exceeded. The program continues to cycle through the above described steps until the predetermined time for the play of the game is exhausted.

In one preferred embodiment, the various symbols, such as ships and submarines, useful in implementing the device described herein are superimposed upon a hologram produced by conventional holographic techniques to achieve a desired three-dimensional background scene. Thus the model 90 is replaced by the hologram, generally in the shape of a rectangular slide. An appropriate light source is then positioned within the console 10 to reproduce the three-dimensional image recorded on the hologram for the viewer.

It should be understood that numerous modifications of the invention described herein can be designed by those skilled in the art that fall within the spirit and scope of the principles of this invention, even if the invention is not practiced as specifically described herein.

What is claimed and desired to be secured by Letters Patent of the United States is:

1. A viewing device comprising:
   a housing;
   a cartridge removably positionable within said housing, said cartridge including means for creating a three-dimensional image within said housing, said housing including means for viewing said image, said cartridge further including a hinged cover, said housing including means for opening and automatically rotating said cover from a closed to an open position upon insertion of said cartridge;
   a light projection means mounted within said housing for selectively superimposing one of a plurality of playing symbols onto said image, said projection means including an array of light emitting elements and a manually actuable means for selectively controlling the operation of said light emitting elements; and
   a light transmitting mirrored surface, rotatably attached to said cartridge and positionable within said housing to reflect at least some of the light from one of said light emitting elements into a viewer's line of sight so that said light appears to be positioned on said image.

2. The device of claim 1 including a microcomputer and a manually actuable switch means electrically connected to said microcomputer for controlling the actuation of said light emitting elements.

3. The device of claim 1 wherein said cover is rotated into alignment with said array of light emitting elements, said cover including a plurality of translucent indicia each surrounded by an opaque border, selectively illuminated by said light emitting elements.

4. The device of claim 3 wherein a translucent mirrored surface is hingedly attached to said cover such that when said cover is rotated upon insertion into said housing, said mirrored surface rotates at least partially with said cover, said housing including stop means for positioning said mirrored surface at an angle of about 45° to said light emitting elements and the viewer's line of sight.

5. The device of claim 3 wherein said means for creating a three-dimensional image includes a three-dimensional model positioned within said cartridge and aligned with the viewer's line of sight.

6. The device of claim 1, said housing including a cam actuator means for automatically opening said cover when said cartridge is inserted into said housing.

7. The device of claim 6, said housing including means for automatically rotating said cover and said mirrored surface to positions wherein said cover is rotated 90° from said three-dimensional surface and said mirrored surface is rotated about 45° from said cartridge.

8. The device of claim 6 wherein said cartridge includes latch means for maintaining the closure of said cover, and guide means for guiding said actuator means into alignment with said latch means.

9. The device of claim 8 wherein said guide means includes a groove in the surface of said cartridge.

10. The device of claim 9 wherein said latch means includes a flexible member and a first catch located on said member in alignment with said groove and a second catch securable to said cover.

11. The device of claim 1 including means for closing said cartridge, said means including a rotating lever operative to close said cover and said mirrored surface into said cartridge.

12. The device of claim 1 including a microcomputer, said microcomputer operative to control the illumination of said light emitting elements in accordance with programmed instructions stored in an external memory, and means for removably connecting said memory to said housing.

13. A viewing device comprising:
   a housing;
   a cartridge removably positionable within said housing, said cartridge including means for creating a three dimensional image within said housing, said housing including means for viewing said image; and said cartridge including a cover over said image means, said housing including means for automatically opening said cover upon insertion of said cartridge into said housing, said cover having light transmissive regions bordered by generally light impenetrable regions.

14. The device of claim 13 wherein said cover is hingedly secured to said cartridge.

15. The device of claim 14, said housing including a cam actuator means for opening said cover.

16. The device of claim 15 said cartridge including a groove mating with said actuator means, said cover being retained to said cartridge by a latch operable by said actuator means when said actuator means slides along said groove.

17. The device of claim 13 said cartridge including a transparent mirrored sheet, mounted for rotation generally around the axis of rotation of said cover.

18. The device of claim 17 including means for supporting said cover in a viewing position, said viewing position angularly spaced from said cartridge and means for supporting said mirrored sheet in a viewing position in the viewer's line of sight angularly spaced from said cartridge but located between said cover and said cartridge.

19. The device of claim 18 including spring means for automatically rotating said cover and said sheet to said viewing position, including means for stopping said sheet in its viewing position.

20. The device of claim 13, said housing including a plurality of light emitting elements aligned with said light transmissive regions when said cover is in its open position.

21. The device of claim 20, said cartridge including a substantially transparent plate rotatably mounted on said cartridge, said plate having a light reflective surface, said plate rotatable to a position within said housing to reflect the light from said light emitting elements into the viewer's line of sight and onto said image.

22. A viewing cartridge comprising:
a housing;
means for creating a three dimensional image;
means for illuminating said image;
means for permitting said image to be viewed;
means for selectively superimposing one of plurality of visual symbols onto said image; and
a cover over said image creating means, said cover being rotatably attached to said cartridge, said cover including substantially transparent indicia on said cover.

23. The cartridge of claim 22 wherein said image creating means is a three-dimensional model located within said cartridge to be viewed.

24. The cartridge of claim 22 including a generally transparent, reflective sheet positionable to reflect said indicia on said cover into the line of viewing of said three-dimensional image.

* * * * *